No. 12,695. REISSUED SEPT. 17, 1907.

W. H. REES.

MUSIC SHEET.

APPLICATION FILED JULY 10, 1907.

Witnesses:

C. F. Mason

E. M. Allen.

Inventor:

W. H. Rees.

by Attorneys

Southgate & Southgate.

UNITED STATES PATENT OFFICE.

WILLIAM H. REES, OF WORCESTER, MASSACHUSETTS, ASSIGNOR TO THE AEOLIAN COMPANY, OF NEW YORK, N. Y., A CORPORATION OF CONNECTICUT.

MUSIC-SHEET.

No. 12,695. Specification of Reissued Letters Patent. Reissued Sept. 17, 1907.

Original Patent No. 825,277, dated July 3, 1906. Divided and this application filed May 7, 1906, Serial No. 315,461. Patented May 28, 1907, No. 855,413. Application for reissue filed July 10, 1907. Serial No. 383,130.

*To all whom it may concern:*

Be it known that I, WILLIAM H. REES, a citizen of the United States, residing at Worcester, county of Worcester, and State of Massachusetts, have invented a new and useful Music-Sheet, of which the following is a specification.

This invention relates to an improved construction of music sheet for use on automatically controlled musical instruments having two sets of speaking devices, such for example as a double manual organ, one set of speaking devices of which corresponds with one key-board or manual while the other set of speaking devices corresponds with the other key-board or manual, such as is described and claimed in my application for patent, Serial No. 289,077, filed November 25, 1905 on an "Automatic musical instrument" of which this application is a division.

The especial object of this invention is to provide a music sheet particularly adapted for use with instruments of the general character mentioned above so as to enable such an instrument to produce, automatically, all variations and combinations which can be made in playing such an instrument by hand.

Figure 2:
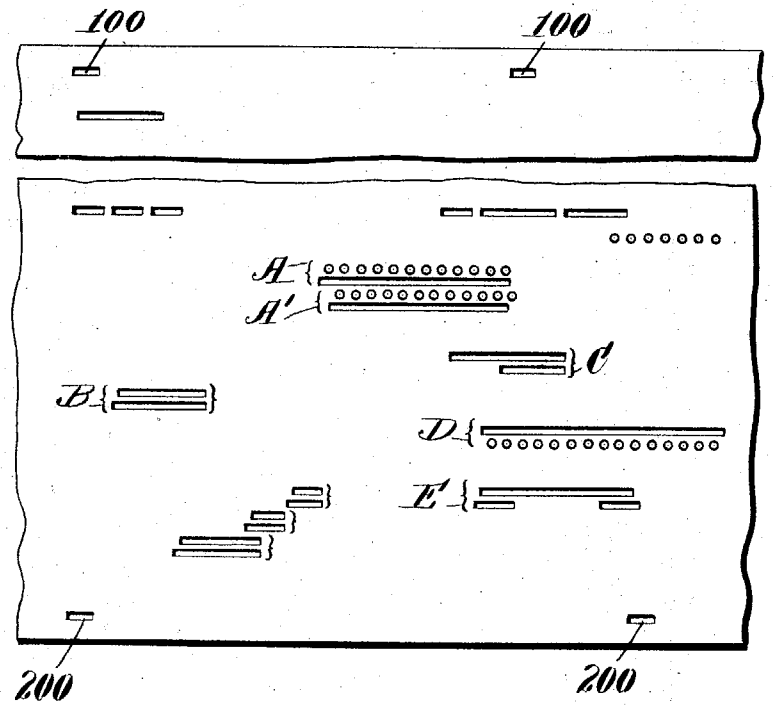
Figure 1:
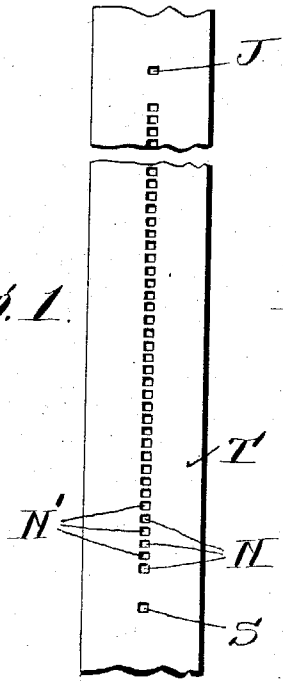

Reference is to be had to the accompanying sheet of drawings which represents one form in which my invention may be embodied and in which, Figure 1 is a plan of a tracker-board such as may be used on instruments of the above mentioned character, and Fig. 2 is a plan partly broken away of a music sheet embodying the present invention.

In playing a double manual organ by hand, it is possible to secure a wide range of effects; for example, a melody may be played on the upper manual and the accompaniment on the lower manual; or a melody may be played on the lower manual and the accompaniment played on the upper manual. By means of couplers, the melody may be sounded upon both manuals and the accompaniment upon either one of the manuals alone; or the melody may be sounded upon either of the manuals while by the couplers, the accompaniment may be sounded on both sets of manuals. Where louder effects are desired, the melody and accompaniment may both be sounded upon both manuals. In addition to these ordinary variations, a skilled organist will also produce more complicated effects, such for example as may be done by "trilling" a note from the upper to the lower manual or by other rapid changes from one manual to the other.

The especial object of the present invention is to provide a music sheet especially adapted for use in the above mentioned ways and for producing any or all of the effects set forth. To accomplish these results in an automatic musical instrument, the tracker-board T is provided with a set of note channels N which control pneumatics for sounding a set of speaking devices which may be regarded as the normal or lower manual. In addition to the note channels, the tracker-board is provided with a supplemental set of channels N′ which operate an individual set of switches, one of these switches corresponding to each note channel and serving to change the sounding of the note from a speaking device corresponding to the lower or normal manual, to a speaking device of the upper or supplemental manual.

The individual switches are of a delicate, quickly responsive construction; permitting instantaneous changes from one manual to the other for "trilling" or rapidly shading effects. The tracker-board is also preferably provided with a main switch channel S corresponding to a single line of perforations of a music sheet for controlling a main switch for causing all notes to be sounded upon the upper or supplemental manual without the use of the individual switches and the tracker-board additionally is preferably provided with a single channel J corresponding with a single line of perforations on the music sheet for actuating a coupler device, not shown, for causing notes to be sounded in unison upon both manuals.

Each of the channels N of the tracker-board which corresponds to a note, is connected by suitable means in such a manner as to exhaust the pressure from a channel leading from one of the speaking devices of a set of such speaking devices corresponding to the lower manual and it is also so connected as to bring into action one of the speaking devices of a set of speaking devices corresponding to the upper manual. These connections are of ordinary construction except as is indicated in the above mentioned application. When operated in this way, the same note will be sounded in unison upon speaking devices in each set of said speaking devices.

The exhaustion of pressure to permit an automatic coupling action is preferably controlled from the marginal tracker-board channel J. This tracker-board channel registers with a single marginal line of perforations of the music sheet and is connected with a coupling device, as is set forth in the above mentioned application, in such a manner as to permit the simultaneous sounding of a note on both manuals for various lengths of time, even down to the very shortest grace notes which could possibly be desired.

As has been stated, corresponding with the note channels N of the tracker-board, the latter is also preferably provided with a supplemental set of perforations N′ one of which corresponds with each note perforation, these supplemental channels preferably alternating with the note channels. Each of these supplemental or individual switch channels is connected to operate a check-valve as is set forth in the above mentioned application. By means of the connections, when an individual switch channel of the tracker-board is open it will permit the sounding of a note corresponding thereto on the upper manual alone unless the coupler has operated, in which case the note will be permitted to be sounded in unison on both manuals. In addition to the individual set of switches, the instrument is also preferably provided with a main switch mechanism controlling all notes simultaneously. For this purpose, the tracker-board is provided with the marginal channel S above mentioned, corresponding with a single line of perforations near the edge of the music sheet. This channel is connected by suitable connections with a series of check-valves each corresponding to one of the note channels, the lifting of each of which admits pressure to a corresponding pneumatic so that the entire set of switch pneumatics will remain shifted so long as the main switch channel S of the tracker-board remains open.

Referring to the drawing for a clear understanding of the cutting of the music sheet and of the variety of musical effects which can be produced thereby, as shown in Fig. 2, the music sheet may be provided along one edge with a line of perforations 100 for operating the coupler mechanism to sound all notes in unison upon both manuals. Near its other margin, the music sheet may be provided with a set of perforations 200 controlling the main switch and causing notes to be sounded on the upper manual. Also a wide variety of elaborate effects may be secured by combinations of the music sheet perforations controlling the individual switch mechanism and the note perforations. For example, the set of music sheet perforations A—A′ will produce "trilling" on two notes of the upper manual; the set of perforations B will produce a single note on the upper manual; the set of perforations C will sound a note first on the lower manual and then switch the latter part of the note to the upper manual; the set of perforations D will produce a "trill" in which the same note is sounded alternately upon the lower and upper manuals; and the set of perforations E will sound a note first on the upper manual which will be switched onto the lower manual and then switched back to the upper manual. These several groups of perforations are, of course, selected for purposes of illustration merely, it being understood that to produce any desired shifting or "trilling" from one manual to the other, it is simply necessary to select the required arrangement of perforations and all possible switching actions can be produced by the action of the individual switches alone, although it is preferred to supplement the individual switches by a main switch. I regard this as desirable, because by controlling the main switch from a single line of perforations of the music sheet, it is possible to avoid multiple cuttings in the music sheet which otherwise might be necessary if a general switching action was produced by the control of the switches individually. It is to be understood also that the particular design of music sheet in which the switch perforations are alternated with the note perforations, and in which the main switch and coupler are controlled by the marginal perforations respectively may be departed from, the same effects being produced no matter on what part of the width of the music sheet the required perforations are located.

Having thus fully described this inventio nd ascertained the manner in which the same is to be performed, what I claim as new and desire to secure by Letters-Patent is—

1. As an article of manufacture, a music sheet having two sets of note perforations located in interspersed rows, one set representing a distinct musical part and the other the accompaniment therefor, said sheet having a marginal row of perforations at the side of the note perforations.

2. As an article of manufacture, a music sheet having two sets of note perforations located in alternate rows, one set representing a distinct and complete musical part and the other the accompaniment therefor, said sheet having a marginal row of perforations at each side of the note perforations, each of said marginal perforations being located in alinement with one or more of the note perforations.

3. As an article of manufacture, a music sheet for use on a double manual automatic musical instrument, said sheet having two sets of note perforations located in alternate rows, one set representing a distinct musical part corresponding to one manual and the other the accompaniment therefor for the other manual, said sheet also having a marginal row of perforations located in transverse alinement with certain of the note perforations, and a second additional row of perforations located in transverse alinement with certain note perforations corresponding to the lower manual, whereby said sheet may be used on a double manual instrument and the two last named rows of perforations may be employed in connection therewith for modifying the rendering of the musical composition represented by said sheet.

In testimony whereof I have hereunto set my hand, in the presence of two subscribing witnesses.

WILLIAM H. REES.

Witnesses:
WALTER E. BANGS,
MRS. W. H. REES.